United States Patent [19]

Gardel et al.

[11] 3,830,521
[45] Aug. 20, 1974

[54] AUTOMATIC SHIFTER ACCESSORY FOR BICYCLES

[75] Inventors: Robert Gardel, New York, N.Y.; Egon Gorsky, West Field, N.J.

[73] Assignee: Mattel, Inc., Hawthorne, Calif.

[22] Filed: Jan. 11, 1973

[21] Appl. No.: 322,833

[52] U.S. Cl. .............................................. 280/236
[51] Int. Cl. ......................................... B62m 25/00
[58] Field of Search ....... 280/236; 74/750 B, 217 B, 74/751, 752 E, 242.14 B

[56] References Cited
UNITED STATES PATENTS

| | | | |
|---|---|---|---|
| 1,091,606 | 3/1914 | Vodoz | 74/750 B |
| 2,487,002 | 11/1949 | Thomas | 74/217 B |
| 2,956,443 | 10/1960 | Nelson | 280/236 X |
| 3,071,984 | 1/1963 | Milenkovic | 74/751 |
| 3,270,589 | 9/1966 | Schwerdhofer | 74/750 B |
| 3,301,095 | 1/1967 | Dotter | 74/752 E |
| 3,513,726 | 5/1970 | Shimano | 74/752 E |
| 3,546,970 | 12/1970 | Schwerdhofer | 74/750 B X |
| 3,608,398 | 9/1971 | Segawa | 74/752 E |
| 3,699,826 | 10/1972 | Lumb | 74/752 E |

*Primary Examiner*—David Schonberg
*Assistant Examiner*—Terrance L. Siemens
*Attorney, Agent, or Firm*—Franklin D. Jankosky; Max E. Shirk

[57] ABSTRACT

An accessory that can be mounted on bicycles of the type which have manually controllable variable speed transmissions, to permit automatic control of the gear ratio. The accessory includes a housing which can be mounted on a frame member of the bicycle, the housing including a governor shaft connected to the rear wheel by a speed sensor, a pair of weights pivotally mounted on the governor shaft, and an output shaft which is moved to position dependent upon the pivotal position of the governor weights. A control member connects the rear wheel in place of the usual manually controlled cable, so that the gear ratio is determined or selected by the automatic shifter from the bicycle speed.

10 Claims, 7 Drawing Figures

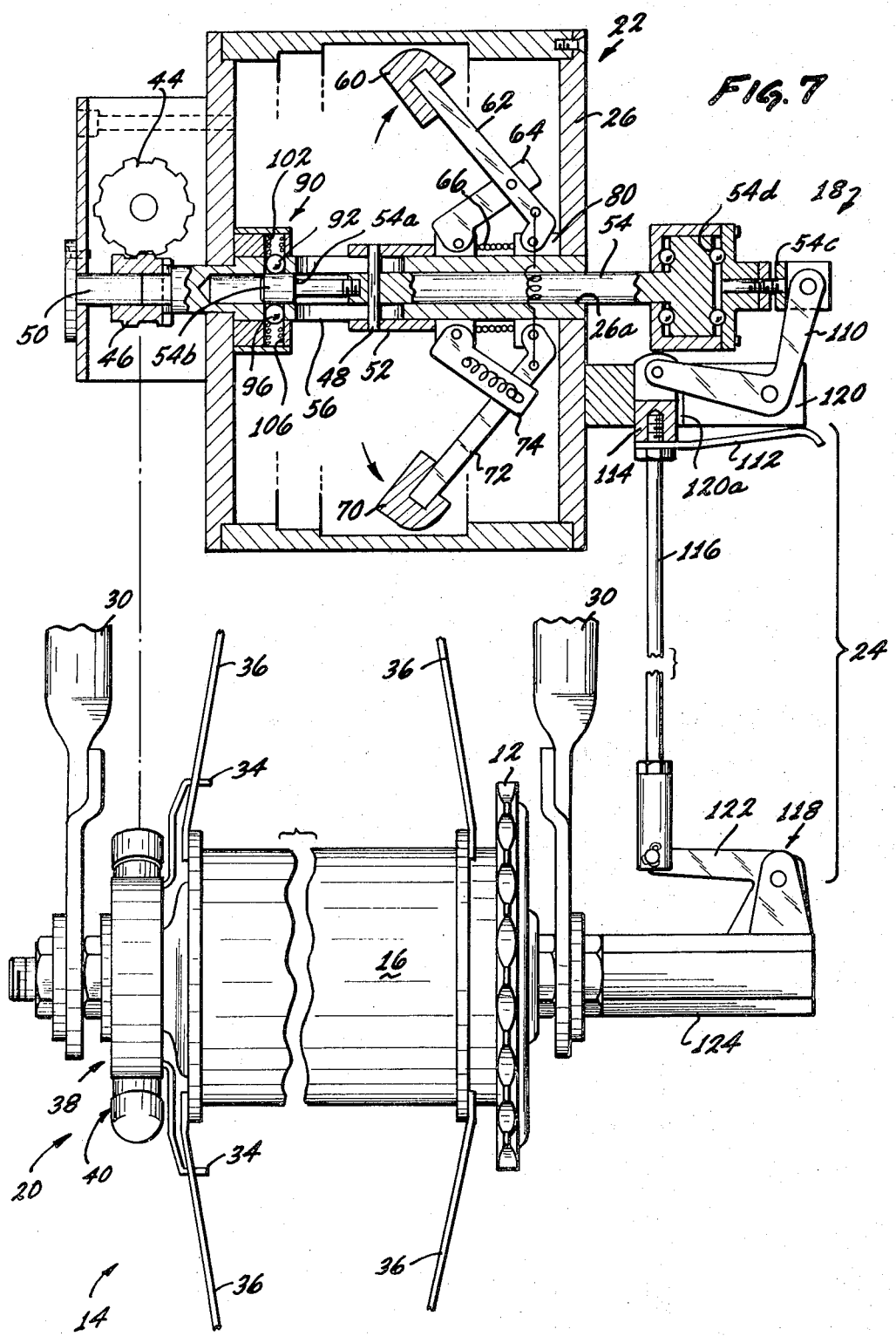

3,830,521

AUTOMATIC SHIFTER ACCESSORY FOR BICYCLES

BACKGROUND OF THE INVENTION

This invention relates to transmissions for bicycle type vehicles.

A large number of bicycles are equipped with variable speed transmissions that change the gear ratio between the speed of the pedal-powered chain and the speed of the rear wheel. A common type of transmission is located in the hub of the rear wheel and includes a shifter member on one side of the rear hub that is connected through a flexible cable to a manual control at the front of the bicycle. The shifter member is constantly pulled inward, but the flexible cable exerts a tension force that fixes the shifter member position and thereby determines the gear ratio of the transmissions. In many instances, it would be desirable to provide an automatic variable speed transmission that would change gear ratios in accordance with the speed of the bicycle. Bicycle transmissions can be built with automatic gear changers, but many persons would be reluctant to purchase a new bicycle just for this feature if their existing bicycles are in good condition. Therefore, the primary object of the present invention is to provide an automatic shifter accessory that may be mounted on a bicycle and may be coupled to the existing variable speed transmission of the bicycle.

SUMMARY OF THE INVENTION

In accordance with one embodiment of the present invention, an accessory is provided which can be mounted on a bicycle of a type which has a variable speed transmission, to convert the transmission control from a manual shift arrangement to an automatic control wherein the gear ratio varies with the speed of the bicycle. The accessory includes a housing that contains a governor mechanism, a speed sensor that connects the rear wheel to an input shaft on the housing, and a coupling that connects an output shaft to the shifter member at the hub of the transmission in place of the manually controlled cable. Brackets are provided to mount the housing on a frame member adjacent the rear wheel of the bicycle. The coupling that connects the output shaft to the shifter member at the hub of the rear wheel is a stiff rod, but could be a cable and sheath. The governor housing may be mounted beneath the seat to keep it close to the rear wheel hub so that a short connecting rod can be utilized. The use of a rod instead of a cable is preferred because it simplifies mounting, inasmuch as a stiff rod does not have to be held along its length to prevent tangling in the wheel or other moving mechanisms.

The governor mechanism includes three coaxial shafts, including an input shaft which rotates but does not slide, an intermediary, or governor, shaft that both slides and rotates, and an output shaft that slides and rotates. A pair of biased governor weights are pivotally mounted to the intermediary shaft and as the rotation of the intermediary shaft increases, the pair of governor weights tend to fly out to overcome the bias to slide the intermediary shaft which in turn carries the output shaft partially out of the housing. A crank connects the output shaft to the connecting rod to move the rod as the output shaft slides partially out of the housing, and the rod moves a shifter member to change the gear ratio of the bicycle transmission.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 7 is a sectional side view of the shifter accessory of FIG. 1, shown in a high speed configuration.

DESCRIPTION OF THE PREFERRED EMBODIMENTS

Figure 1:
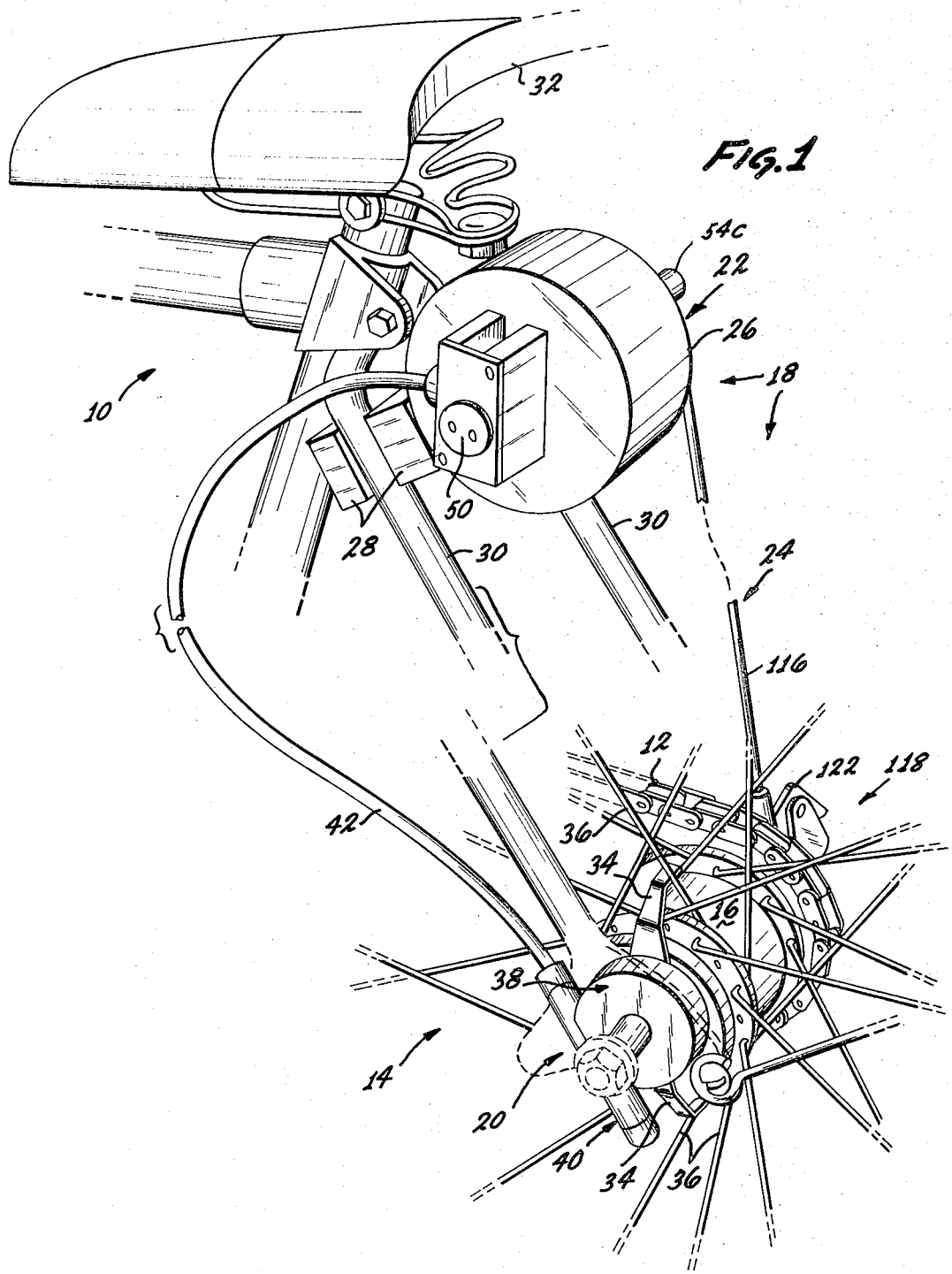
FIG. 1 is a partial perspective view of a bicycle and automatic shifter accessory constructed in accordance with the present invention.

FIG. 1 illustrates a portion of a bicycle 10 which has a chain drive 12 that is connected to a rear wheel 14 by a variable speed transmission 16 located within the hub of the rear wheel 14. An automatic shifter means 18 of the invention is mounted on the bicycle 10 and coupled to the transmission 16 in place of the usual manually controllable flexible cable, to automatically change the gear ratio between pedal power applied through the chain drive 12 and the speed at which the rear wheel 14 is driven.

Figure 5:
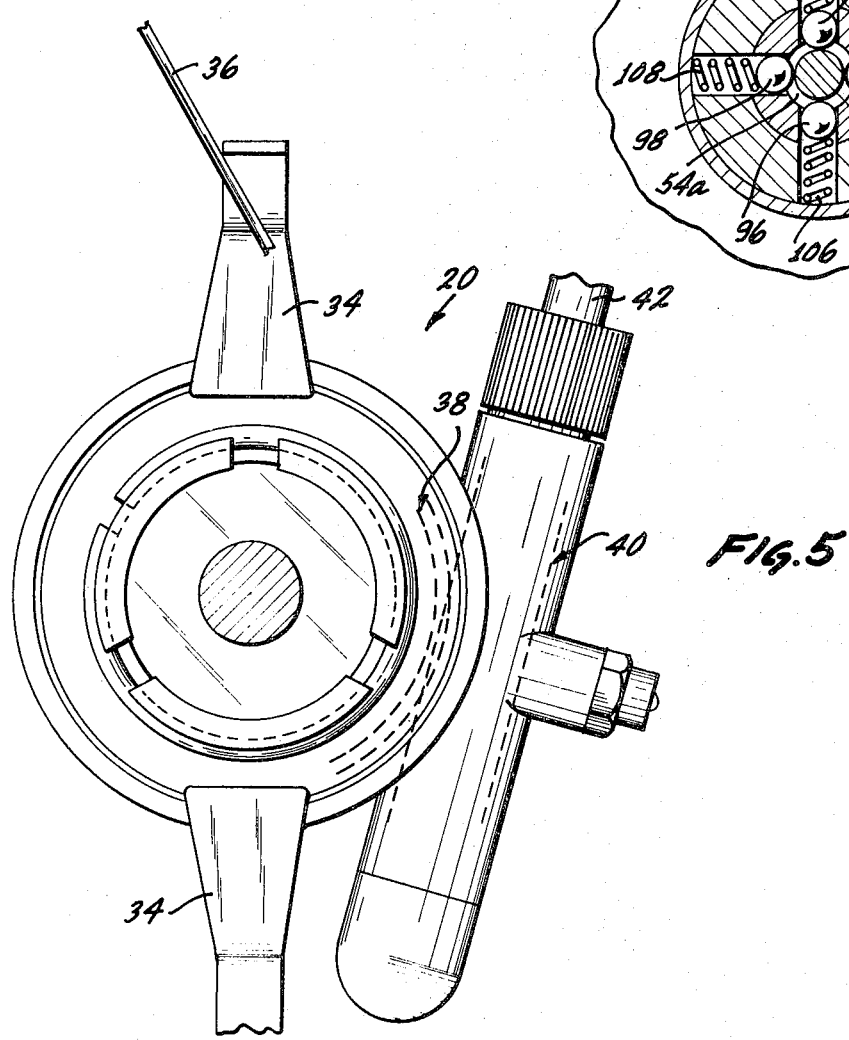
FIG. 5 is a cross sectional view of the input sensor of FIG. 2 taken along the lines 5—5.

The automatic shifter means 18 is comprised of an input sensing means 20, a governor controlled mechanism 22 and an output shifting means 24. The governor controlled mechanism 22 includes a housing 26 which is attached by a bracket 28 to the frame 30 of the bicycle 10, so that the governor controlled mechanism 22 may lie immediately beneath the seat 32 of the bicycle 10. The input sensing means 20 may be of the typical speedometer type as illustrated in FIG. 5. The input sensing means 20 includes a pair of arms 34 that are connected to the rear wheel spokes 36, a worm wheel 38, a high helix-angle worm 40, and an output cable 42 which couples the ground speed of the bicycle 10 to the governor controlled mechanism 22.

Figure 2:
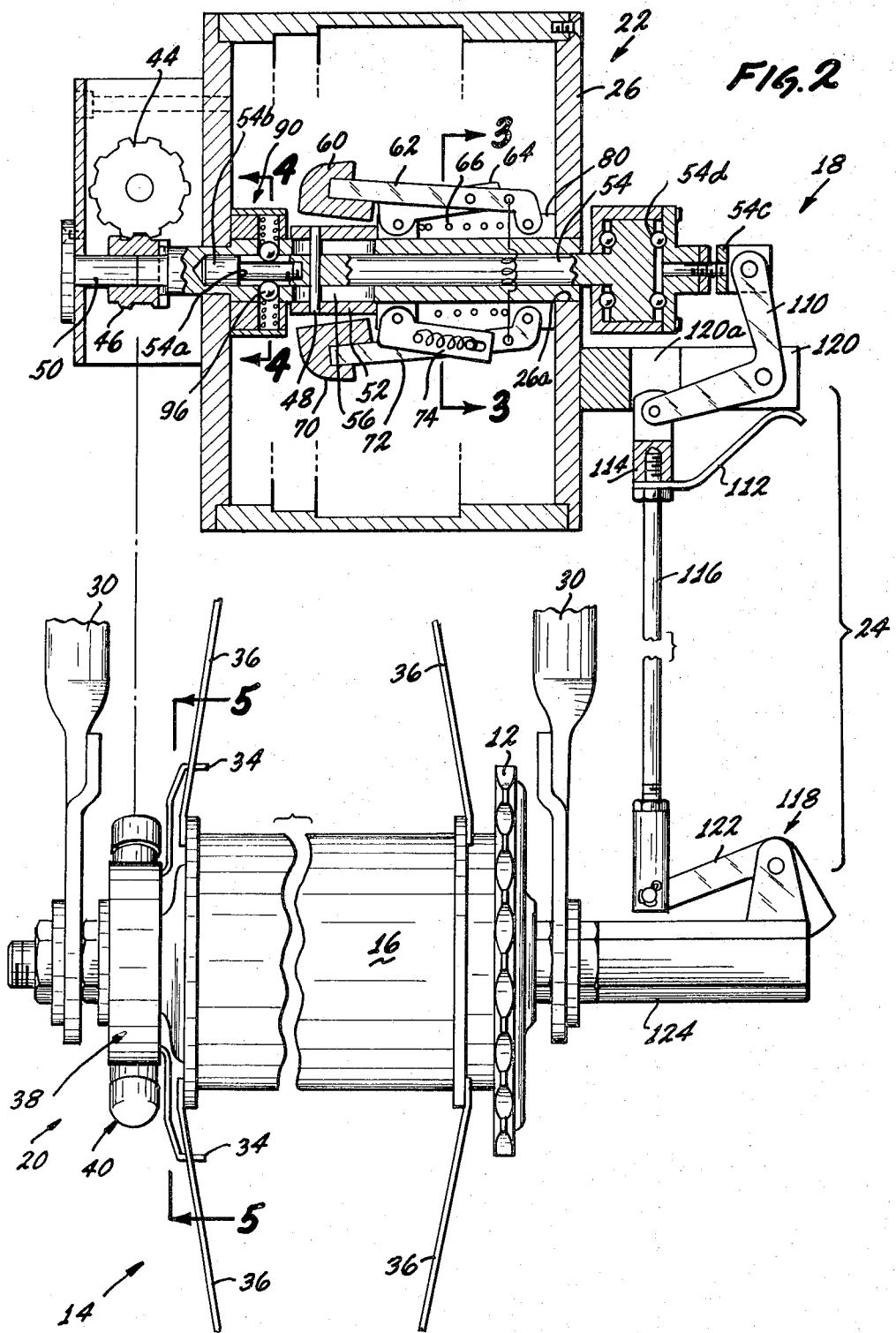
FIG. 2 is a sectional side view of the shifter accessory of FIG. 1, shown in a low speed configuration.

Referring now to FIG. 2, there is shown a sectional side view of the automatic shifter means 18, with the governor controlled mechanism 22 being in a low speed configuration. The governor controlled mechanism 22 generally includes an input shaft 50, an intermediary shaft, or governor shaft, 52, and output shaft 54. A gear 44 is coupled to the output cable 42 and the gear 44 rotates at the ground speed of the bicycle 10. The gear 44 rotatably drives the input shaft 50 via the worm gear 46 that is mounted to the left end of the input shaft 50. The input shaft 50 extends through an opening 26a on the right side of the housing 26. The output shaft 54 is located within the input shaft 50 and the intermediary shaft 52 is located on the outside of the input shaft 50. All three of the shafts 50, 52 and 54 are coupled together by means of a pin 48. Thus, all three shafts rotate proportional to the ground speed of the bicycle 10. In addition to the rotational movement, the intermediary shaft 52 and the output shaft 54 are mounted for axial sliding by means of a slot 56 in which the pin 48 is located. Thus, intermediary shaft 52 may slide along the exterior surface of input shaft 50 and output shaft 54 may slide along the inner surface of the input shaft 50.

Figure 3:
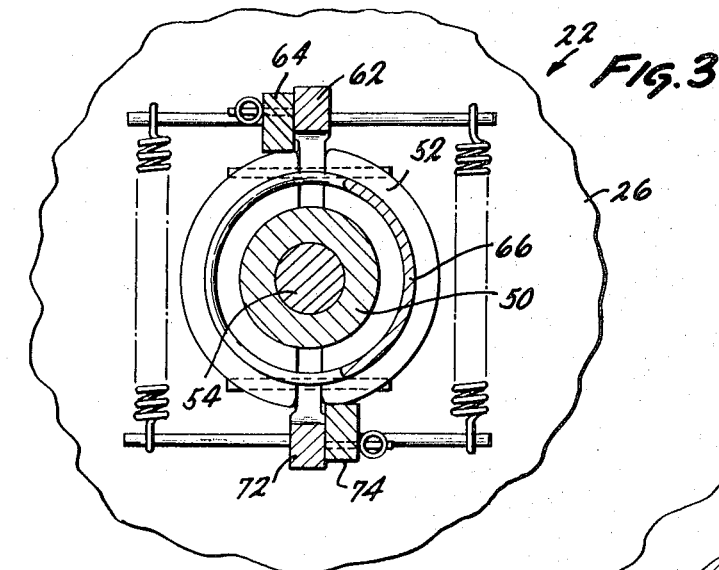
FIG. 3 is a cross sectional view of the shifter accessory of FIG. 2 taken along lines 3—3.
Figure 6:
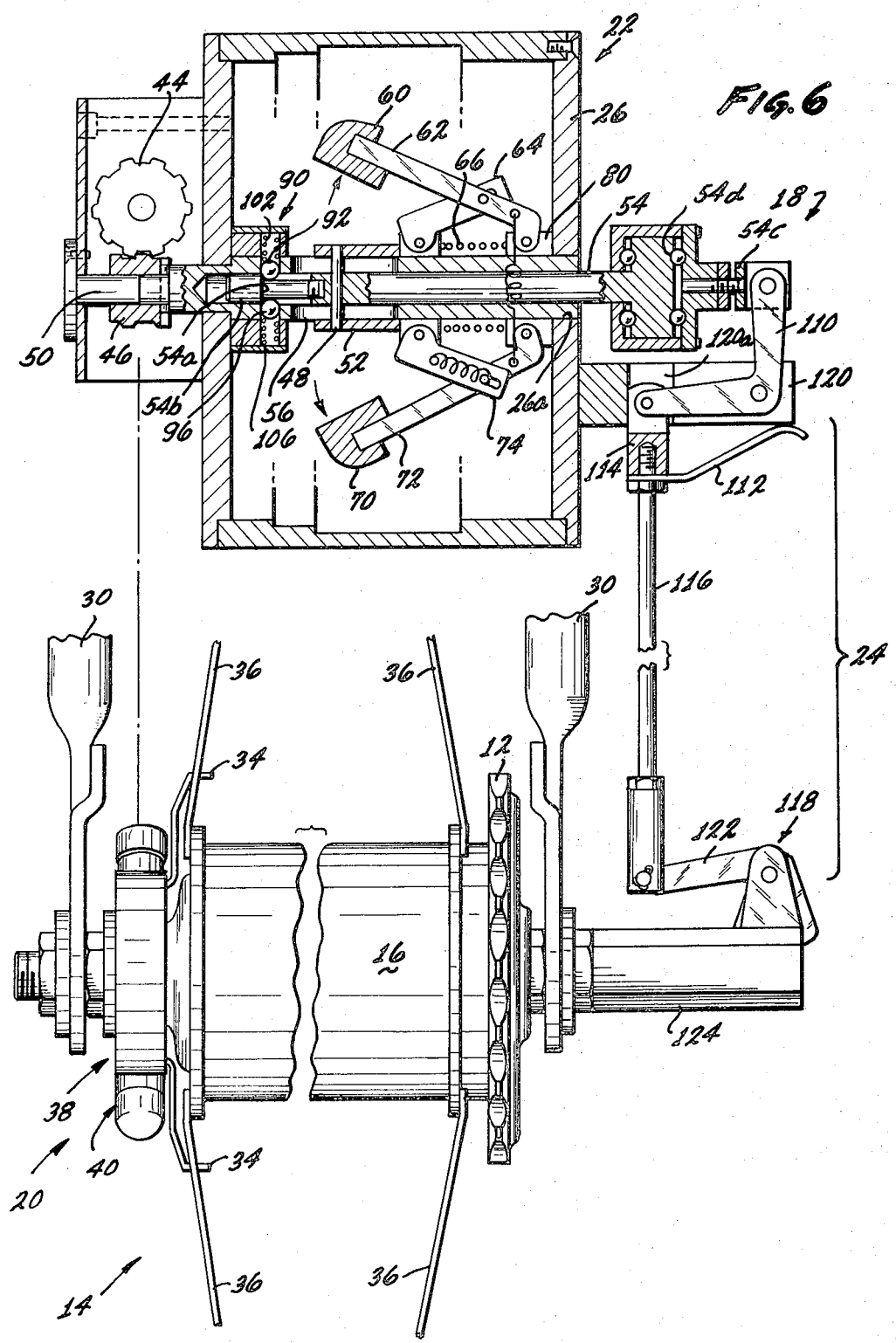
FIG. 6 is a sectional side view of the shifter accessory of FIG. 1, shown in a medium speed configuration.

Referring now to FIG. 3, there is shown a sectional front view of a part of the automatic shifter means 18, taken along the lines 3—3 of FIG. 2. Referring also to FIG. 2, a pair of weights 60 and 70 are mounted to the outer ends of a first pair of links 62 and 72, respectively. The inner ends of the pair of links 62 and 72 are pivotally connected to the bracket 80 that rotates around input shaft 50. A second pair of links 64 and 74 are pivotally mounted at their respective both ends between the first pair of links 62 and 72 and a bracket 82 as shown. When the intermediary shaft 52 rotates, the weights 60 and 70 tend to fly out as shown in FIGS. 6 and 7. However, at a low ground speed, the biasing of the coil spring 66 will maintain the weights 60 and 70 in the closed position of FIG. 2. In this position, the intermediary shaft 52 and the output shaft 54 are in their foremost left position.

As the ground speed of the bicycle 10 increases, the rotational input shaft 50 will increase, which in turn will increase the speed of rotation of the intermediary shaft 52. As shown in FIG. 6, the centrifugal force of the rotating weights 60 and 70 overcomes the resistance of the coil spring 66, and the intermediary shaft 52 moves to the right and carries the output shaft 54 to the right. As shown in FIG. 7, the ground speed of the bicycle has increased to the point wherein the speed of rotation of the intermediary shaft 52 has increased sufficiently to move the weights 60 and 70 to their maximum position as limited by the length of the full compressed coil spring 66. In turn, the output shaft 54 has moved to its extreme right position.

Figure 4:
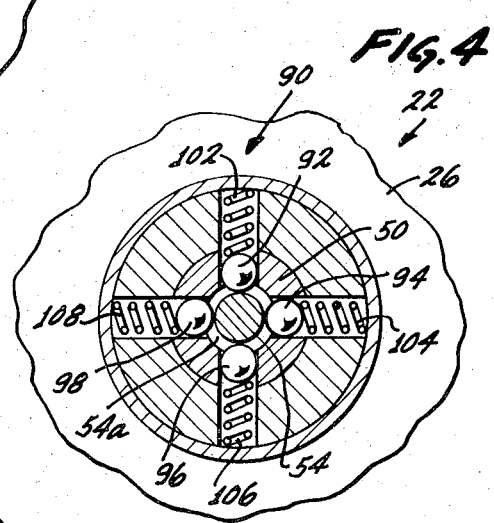
FIG. 4 is a cross sectional view of the shifter accessory of FIG. 2 taken along the lines 4—4.

Before the output shaft 54 can move to its extreme right position, the weights 60 and 70 must also overcome the secondary biasing means 90. The secondary biasing means 90, a cross sectional view of which is illustrated in FIG. 4, is comprised of four ball bearings 92, 94, 96 and 98 which normally are biased against the intermediary by means of the springs 102, 104, 106 and 108. However, when the speed of rotation of the intermediary shaft 52 has increased sufficiently, the ball bearings 92, 94, 96 and 98 will ride over the detent portion 54a of the intermediary shaft 54 and will be in contact with the raised portion 54b of the shaft 54.

Referring now to FIGS. 2, 6 and 7, the output shifting means 24 is illustrated in its respective positions relating to the ground speed of the bicycle 10. The output shifting means 24 generally includes a crank 110, a leaf spring 112, a slideable plunger 114, a rod 116 and shifter means 118. The upper end of the crank 110 is pivotally mounted to a non-rotating member 54c of the output shaft 54. The bearing means 54d enable the member 54c to be slideable and non-rotating relative to the output shaft 54. The center part of crank 110 is pivotally mounted to a stationary bracket 120 and the other end of the crank 110 is pivotally connected to the slideable plunger 114. The slideable plunger 114 is received within a slot 120a of the stationary bracket 120. The leaf spring 112 urges the slideable plunger and its attached rod 116 down towards the shifter means 118. The shifter means 118 includes a lever 122 that is connected to the bottom part of the rod 116 and is pivotally mounted to a transmission gear engaging member 124. As the ground speed of the bicycle 10 increases, the output shaft 54 slides out of the governor controlled mechanism 22, and the crank 110 raises the rod 116, which in turn, moves the lever 118 to change the gear ratio of the transmission 16. The hub-located transmission 16 is of the type that is in common use and its details of construction are well known in the art, therefore, the details of construction are not illustrated or described herein.

The rod 116 is used primarily to transmit tensile forces. However, instead of utilizing a cable as is commonly employed in manual shifting mechanisms, the rod 116 is a substantially rigid rod. The use of a rod simplifies the mounting of the shifter accessory on the bicycle. If a cable were utilized, then there would be a danger of entangling of the cable in rotating parts of the bicycle, and particularly the spokes of the wheel. Entangling could occur particularly at low speed when any cable may not be under tension. The use of a rod 116 simplifies mounting because the rod resists sideward deflection, and therefore can be mounted close to the spokes of the wheel without danger of entangling in the spokes.

Thus, although the present invention has been shown and described with reference to particular embodiments, for example, input sensing means 20 of the worm wheel type, nevertheless, various changes and modifications obvious to a person skilled in the art to which the invention pertains, for example, input sensing means 20 that is a friction drive type directly from the rear tire, are deemed to lie within the spirit, scope and contemplation of the invention as set forth in the appended claims.

What is claimed is:

1. An automatic shifter accessory for mounting on a bicycle vehicle that has a shift member, a pedal, at least one wheel driven by said pedal and a gear-change mechanism, said gear-change mechanism changing the pedal-to-wheel gear ratio in accordance with the position of said shift member, comprising:
   a governor mechanism;
   means for attaching said governor mechanism to said vehicle;
   speed sensing means for coupling the ground speed of said vehicle to said governor mechanism to drive the governor mechanism at a speed proportional to the ground speed of said vehicle;
   an elongated control member connected to said shift member to transmit shifting forces thereto; and
   coupling means connecting said governor mechanism to said control member to move it in accordance with the speed of rotation of said governor mechanism.

2. The accessory described in claim 1 wherein:
   said elongated control member is a substantially rigid rod, whereby to avoid the possibility of entanglement of the control member in the rear wheel without closely guiding the control member.

3. The accessory described in claim 1 wherein said governor mechanism includes:
   a housing;
   a governor shaft rotatably mounted on said housing and connected to said coupling means;
   a frame fixed to said governor shaft;

a pair of weight means pivotally mounted on said governor frame so they are urged to move redially outward with a force dependent upon the speed of rotation of said governor shaft; and means responsive to pivoting of said weight means for sliding said governor shaft.

4. The accessory described in claim 1 wherein:

said governor mechanism includes a housing and three coaxial shafts, said coaxial shafts including a first shaft mounted for rotation without sliding, a second shaft mounted for rotation and axial sliding, and a third shaft mounted for axial sliding and rotation;

said governor mechanism also including a weight member pivotally mounted on said second shaft to rotate with it and coupled to said housing to shift the second shaft by an amount dependent upon the amount of weight-member pivoting; and said speed sensing means is connected to said first shaft, and said coupling means is connected to said third shaft.

5. The accessory described in claim 1 wherein said one wheel includes a hub and wherein said gear-change mechanism is mounted in said hub.

6. An automatic shifter accessory for mounting on the frame of a bicycle vehicle that has a wheel with a gear-change mechanism in the hub that changes the pedal-to-wheel gear ratio in accordance with the position of a shift member thereof, comprising:

an accessory housing;

means for attaching said housing to said vehicle frame;

a governor mechanism mounted in said housing;

speed sensing means for coupling said governor mechanism to said vehicle in such a manner that said governor mechanism is driven at a speed proportional to the speed of said vehicle;

an elongated control member extending from said housing for connection to said shaft member to transmit shifting forces thereto; and coupling means mounted on said housing for connecting said governor mechanism to said control member for moving it in accordance with the speed of rotation of said governor mechanism.

7. The accessory described in claim 6 wherein:

said means for attaching said housing to said vehicle frame is constructed to hold the housing immediately below the seat portion of the bicycle vehicle adjacent the rear wheel thereof; and said elongated control member is a substantially rigid rod, whereby to avoid the possibility of entanglement of the control member in the rear wheel without closely guiding the control member.

8. The accessory described in claim 6 wherein:

said governor mechanism includes a governor shaft rotatably mounted in said housing and connected to said coupling means, a frame fixed to said governor shaft, a pair of weight means pivotally mounted on said governor frame so they are urged to move radially outward with a force dependent upon the speed of rotation of the governor shaft, and means responsive to pivoting of the weight means for sliding said governor shaft.

9. The accessory described in claim 6 wherein:

said governor mechanism includes three coaxial shafts including a first shaft mounted for rotation without sliding, a second shaft mounted for rotation and axial sliding, and a third shaft mounted for axial sliding and rotation;

said governor mechanism also including a weight member pivotally mounted on said second shaft to rotate with it and coupled to the housing to shift the second shaft by an amount dependent upon the amount of weight-member pivoting; and said speed sensing means is connected to said first shaft, and said coupling means is connected to said third shaft.

10. A bicycle comprising:

a bicycle frame;

a seat mounted on the frame;

a chain drive;

a rear wheel assembly mounted on the frame, including a variable gear ratio transmission mounted on the frame and connected to the chain drive to be driven by it and a wheel rotatably connected to the transmission including a shift member which can be pulled to a plurality of different positions to change the gear ratio of the transmission;

an automatic shifter housing mounted on the frame immediately below the seat;

an input shaft rotatably mounted in the housing;

a governor shaft rotatably and slideably mounted in the housing;

an output shaft rotatably slideably mounted on the housing;

weight means for sliding said output shaft with said governor shaft;

speed sensing means for coupling the rear wheel to the input shaft to rotate said input shaft at a speed dependent upon the rear wheel speed; and means coupling the output shaft to the shift member to move the shift member.

* * * * *